US010173320B1

United States Patent
Prisament et al.

(10) Patent No.: US 10,173,320 B1
(45) Date of Patent: Jan. 8, 2019

(54) ROBOT TASK OPTIMIZATION BASED ON HISTORICAL TASK AND LOCATION CORRELATED DURATIONS

(71) Applicant: X Development LLC, Mountain View, CA (US)

(72) Inventors: Gregory Prisament, East Palo Alto, CA (US); Laura Stoia, Mountain View, CA (US); Yuchen Wu, San Francisco, CA (US); Alan Thompson, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 64 days.

(21) Appl. No.: 15/177,321

(22) Filed: Jun. 8, 2016

(51) Int. Cl.
*B25J 9/00* (2006.01)
*B25J 9/16* (2006.01)
*B25J 11/00* (2006.01)

(52) U.S. Cl.
CPC .......... *B25J 9/1664* (2013.01); *B25J 9/0003* (2013.01); *B25J 11/0085* (2013.01); *Y10S 901/01* (2013.01); *Y10S 901/40* (2013.01); *Y10S 901/41* (2013.01)

(58) Field of Classification Search
None
See application file for complete search history.

(56) References Cited

U.S. PATENT DOCUMENTS

| 8,285,417 | B2 * | 10/2012 | Kawaguchi | ............ B25J 9/1661 700/245 |
| 8,428,777 | B1 | 4/2013 | Poursohi et al. | |
| 8,433,442 | B2 | 4/2013 | Friedman et al. | |
| 8,639,644 | B1 | 1/2014 | Hickman et al. | |
| 8,755,936 | B2 | 6/2014 | Friedman et al. | |
| 8,830,057 | B1 | 9/2014 | Poursohi et al. | |
| 9,008,839 | B1 * | 4/2015 | Kuffner, Jr. | ............ B25J 9/0084 700/248 |
| 9,026,248 | B1 * | 5/2015 | Hickman | ............ B25J 3/00 700/246 |
| 9,092,381 | B2 * | 7/2015 | Sasakura | ............ H04L 65/4084 |
| 9,205,886 | B1 | 12/2015 | Hickman et al. | |

(Continued)

FOREIGN PATENT DOCUMENTS

EP 1967116 A1 9/2008

OTHER PUBLICATIONS

Ahmadi et al. "A Multi-Robot System for Continuous Area Sweeping Tasks." Department of Computer Sciences—The University of Texas at Austin; http://www.cs.utexas.edu/~{mazda,pstone}; pp. 1724-1729. May 15, 2006.

(Continued)

*Primary Examiner* — Truc M Do
(74) *Attorney, Agent, or Firm* — Middleton Reutlinger

(57) ABSTRACT

Methods, apparatus, systems, and computer-readable media are provided for optimizing robot-implemented tasks based at least in part on historical task and location correlated duration data collected from one or more robots. Historical task and location correlated duration data may, in some implementations, include durations of different tasks performed in different locations by one or more robots in one or more particular environments, and knowledge of such durations may be used to optimize tasks performed by the same or different robots in the future.

20 Claims, 8 Drawing Sheets

(56) References Cited

U.S. PATENT DOCUMENTS

| | | | |
|---|---|---|---|
| 9,840,007 B1* | 12/2017 | Kuffner | B25J 9/1671 |
| 2008/0086236 A1* | 4/2008 | Saito | G01S 5/0252 |
| | | | 700/245 |
| 2009/0234788 A1* | 9/2009 | Kwok | G06N 3/006 |
| | | | 706/46 |
| 2010/0145514 A1* | 6/2010 | Kim | B25J 9/161 |
| | | | 700/248 |
| 2010/0174436 A1* | 7/2010 | Matsunaga | B25J 9/1664 |
| | | | 701/26 |
| 2010/0217438 A1* | 8/2010 | Kawaguchi | B25J 9/1661 |
| | | | 700/248 |
| 2013/0100250 A1* | 4/2013 | Raskar | H04N 13/02 |
| | | | 348/46 |
| 2015/0339589 A1* | 11/2015 | Fisher | G06N 99/005 |
| | | | 706/12 |
| 2016/0135655 A1 | 5/2016 | Ahn et al. | |

OTHER PUBLICATIONS

Caloud et al. "Indoor Automation with Many Mobile Robots." CIFE Working Paper, No. 12; Jan. 1992; Stanford University; 15 pages.

* cited by examiner

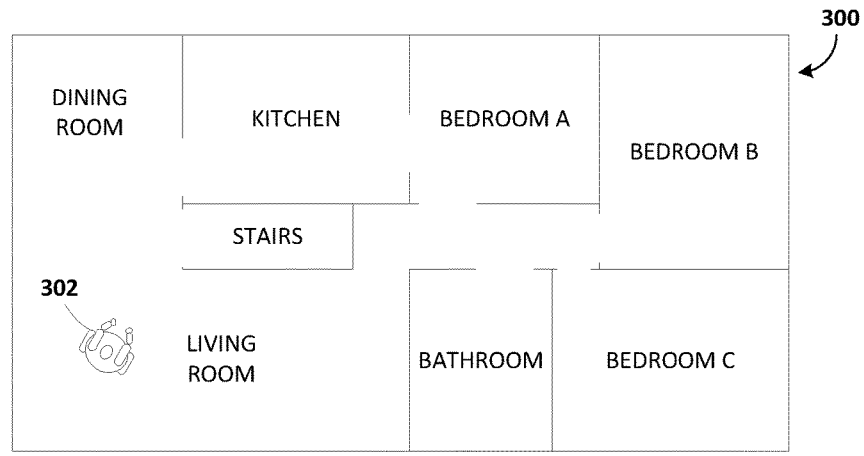

Fig. 4

| DATE | TIME | POSITION | AREA | ACTION |
|---|---|---|---|---|
| 01/01/2012 | 08:02:35.47 | 17.48, 2.28 | KITCHEN | START DISHWASHING |
| 01/01/2012 | 08:07:33.11 | 15.38, 1.35 | KITCHEN | STOP DISHWASHING |
| 01/01/2012 | 08:07:34.15 | 15.38, 1.35 | KITCHEN | MOVE TO LIVING ROOM |
| 01/01/2012 | 08:07:53.31 | 4.33, 24.68 | LIVING RM | START VACUUMING |
| 01/01/2012 | 08:33:25.66 | 17.12, 27.03 | LIVING RM | STOP VACUUMING |
| 01/01/2012 | 08:33:26.43 | 17.12, 27.03 | LIVING RM | MOVE TO DINING ROOM |
| 01/01/2012 | 08:33:48.76 | 5.44, 8.93 | DINING RM | START VACUUMING |
| 01/01/2012 | 08:39:12.49 | 2.84, 3.34 | DINING RM | REMOVE BLOCKAGE |
| 01/01/2012 | 08:41:51.81 | 3.87, 9.14 | DINING RM | STOP VACUUMING |
| ... | ... | ... | ... | ... |

304

212 EXTRACT DURATION DATA FROM LOG

Fig. 5

| USERID | ROBOT | TASK | LOCATION | DURATION |
|---|---|---|---|---|
| 0003343 | 0001184 | DISHWASHING | KITCHEN | 00:04:57.64 |
| 0003343 | 0001184 | VACUUMING | LIVING RM | 00:15:32.35 |
| 0003343 | 0001184 | VACUUMING | DINING RM | 00:08:03.05 |
| ... | ... | ... | ... | ... |

306

ROBOT TASK OPTIMIZATION BASED ON HISTORICAL TASK AND LOCATION CORRELATED DURATIONS

BACKGROUND

An autonomous or semi-autonomous robot may be called upon to handle a wide variety of tasks in a wide variety of environments. Assessing performance of a robot in connection with the performance of such tasks, however, can be difficult, particularly in applications where the nature of the tasks performed by a robot are such that the tasks are not repeatable using the exact same sequence of operations each time. In an illustrative example of a multipurpose residential cleaning robot, for example, cleaning tasks may differ each time they are performed due to the presence of different obstructions, differing degrees of cleanliness or uncleanliness, etc. Adapting the operation of a robot to better accommodate differing environments and conditions is generally desirable, so a need generally exists for improved manners of optimizing robot tasks in such variable environments.

SUMMARY

The present disclosure is generally directed to methods, apparatus, and computer-readable media (transitory and non-transitory) for optimizing tasks performed by a robot based upon historical task and location correlated duration information collected from one or more robots performing similar tasks in the same or different spatial regions or environments. Historical task and location correlated duration information may, in some implementations, include durations of different tasks performed in different locations by one or more robots in one or more particular environments, and knowledge of such durations may be used to optimize tasks performed by the same or different robots in the future.

In some implementations for example, a method performed by one or more processors includes determining historical task and location correlated duration data for one or more tasks performed by a first robot in a plurality of locations of a spatial region served by the first robot, the historical task and location correlated duration data including a first duration of a first task performed by the first robot in a first location of the spatial region served by the first robot, and optimizing performance of a second task by the first robot or by a second robot based upon the first duration of the first task.

Some implementations also include aggregating historical task and location correlated duration data for multiple tasks performed by multiple robots in multiple spatial regions served by the multiple robots. In some implementations, optimizing performance of the second task includes detecting a systemic issue based upon the aggregated historical task and location correlated duration data and/or the historical task and location correlated duration data for the first robot. In some implementations, optimizing performance of the second task includes reengineering the second task based upon the aggregated historical task and location correlated duration data and/or the historical task and location correlated duration data for the first robot. Further, in some implementations, optimizing performance of the second task includes generating a user notification or recommendation based upon the aggregated historical task and location correlated duration data and/or the historical task and location correlated duration data for the first robot. Some implementations also include normalizing the historical task and location correlated duration data for the first robot to account for environmental variances relative to the aggregated historical task and location correlated duration data.

In some implementations, optimizing performance of the second task includes generating a schedule for the first robot. In some implementations, generating the schedule for the first robot includes generating the schedule to accommodate a user schedule restriction, historical presence data and/or task priority user feedback, and in some implementations, the task priority user feedback is non-explicit user feedback.

Some implementations also include generating a heatmap for at least a portion of the spatial region served by the first robot based upon the historical task and location correlated duration data, and some implementations include generating a visualization of the heatmap to illustrate location correlated activity levels throughout the portion of the spatial region. In some implementations, the heatmap is a comparative heatmap comparing activity levels in the portion of the spatial region against activity levels associated with aggregated historical task and location correlated duration data associated with other spatial regions.

In some implementations, determining the historical task and location correlated duration data includes retrieving archived historical task and location correlated duration data, and in some implementations, determining the historical task and location correlated duration data includes extracting task and location correlated duration data from an activity log of the first robot. Further, in some implementations, determining the historical task and location correlated duration data further includes extracting one or more events from the activity log, and in some implementations, the first robot is a multipurpose residential cleaning robot, and the spatial region comprises a dwelling.

Some implementations also include apparatus including memory and one or more processors operable to execute instructions stored in the memory to perform any of the methods discussed above. In some implementation the memory and one or more processors are resident in a data processing system interfaced with the first and second robots, while in other implementations the memory and the one or more processors are resident in a robot. Some embodiments also include a non-transitory computer readable storage medium storing computer instructions executable by one or more processors to perform any of the methods discussed above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 depicts an example environment in which disclosed techniques may be implemented, in accordance with various implementations.

FIG. 5 depicts an extraction of duration data from an example robot log generated when performing tasks in the environment of FIG. 4.

DETAILED DESCRIPTION

In various implementations tasks performed by one or more robots may be optimized based upon historical task and location correlated duration data determined from the activities of the same and/or different robots when performing the same or different tasks. Historical task and location correlated duration data, in this regard, may be considered to refer generally to data that is representative of the amount of time a robot performs a given task in a given location. A task may be considered to be practically any operation or activity that a robot can perform in an environment, which may vary depending upon the type of robot and the environment within which the robot is adapted for use.

In the implementations discussed herein, for example, a residential multipurpose cleaning robot (e.g., capable of performing various tasks such as vacuuming, dishwashing, organizing, picking up, floor cleaning, clothes washing, and/or bathroom cleaning, among others) is used for the purposes of illustration and explanation. However, it will be appreciated that the types and combinations of tasks capable of being performed by a robot are innumerable and can vary widely for different applications and/or environments, e.g., for various residential, commercial, industrial, agricultural, and other applications and/or environments. Moreover, it will be appreciated that the concept of a task may vary in terms of complexity, and as such, tasks may be considered to incorporate other lower-level tasks, or may be considered to be operations of other, higher-level tasks. In the aforementioned residential multipurpose cleaning application, for example, in some implementations a task may be considered to include a higher-level activity such as "cleaning a room" while in other implementations, a task may be more detailed, e.g., "cleaning a sink" or "washing the dishes."

A location may be considered to be a single point or a spatial region, e.g., an area or volume in a two or three dimensional space. A location may be defined with spatial particularity, e.g., in terms of specific points in space and/or specific dimensions, or may be defined or at least identified more generally, e.g., in terms of a room, a dwelling or other definable area. Duration data may also be considered to be any data that is representative of an amount of time that a robot spends performing some operation, activity or task. Duration data may be absolute or relative, and may include, for example, a starting and/or timestamp based on absolute time or from some other common frame of reference, an absolute length of time, a relative length of time (e.g., 10% over some standard or expected duration), etc.

Figure 1:
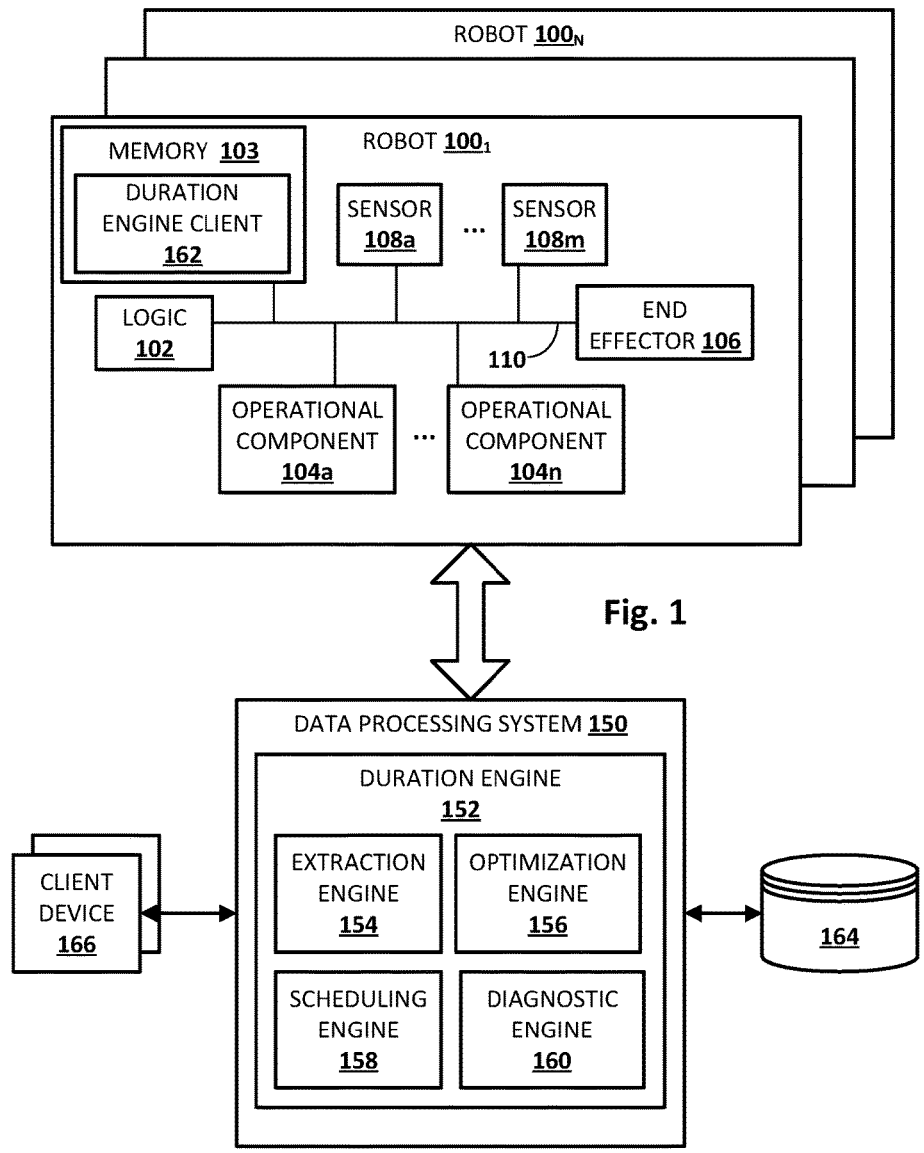
FIG. 1 schematically depicts an example environment in which disclosed techniques may be implemented, in accordance with various implementations.

Now turning to the drawings, wherein like numbers denote like parts throughout the several views, FIG. 1 schematically depicts an example environment in which disclosed techniques may be implemented to optimize tasks performed by robots based upon historical task and location correlated duration data, in accordance with various implementations. In particular, FIG. 1 depicts one or more robots $100_{1-N}$, each of which may take various forms, including but not limited to a telepresence robot, a robot arm, a humanoid, an animal, an insect, an aquatic creature, a wheeled device, a submersible vehicle, an unmanned aerial vehicle ("UAV"), and so forth. Each robot may also include logic 102 operably coupled to memory 103 (e.g., RAM, ROM, DRAM, flash, etc.), one or more operational components 104$a$-$n$, one or more end effectors 106, and one or more sensors 108 via one or more buses 110. Logic 102 may, in various implementations, include one or more processors, such as one or more so-called "real time processors" that are guaranteed to perform various operations within various temporal constraints.

As used herein, "operational components" 104 of a robot may refer to actuators, motors (e.g., servo motors), joints, shafts, gear trains, wheels, tracks, pumps (e.g., air or liquid), pistons, drives, or other components that may create and/or undergo propulsion, rotation, and/or motion to move components of robot 100 relative to each other, and/or to move robot 100 as a whole. Some operational components may be independently controllable, although this is not required. In some instances, the more operational components robot 100 has, the more degrees of freedom of movement it may have.

As used herein, "end effector" 106 may refer to a variety of tools that may be operated by robot 100 in order to accomplish various tasks. For example, some robots may be equipped with various types of "grippers," including but not limited to "impactive" (e.g., "grab" objects using opposing digits), "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth.

Sensors 108 may take various forms, including but not limited to cameras, light sensors (e.g., passive infrared), pressure sensors, pressure wave sensors (e.g., microphones), proximity sensors, torque sensors, force sensors, radars, range finders, accelerometers, gyroscopes, compasses, position coordinate sensors (e.g., global positioning system, or "GPS"), speedometers, drop off sensors (e.g., to detect an edge of a raised surface), and so forth. While sensors 108$a$-$m$ are depicted as being integral with robot 100, this is not meant to be limiting. In some implementations, sensors 108 may be located external to, but may be in direct or indirect communication with, robot 100, e.g., as standalone units or as part of robot management system 150.

Robots $100_{1-N}$ may be in communication with, and in some implementations may be controlled and/or managed to various degrees by, a data processing system 150. Data processing system 150 may include one or computing systems connected by one or more networks (not depicted) that communicate with, and in some implementations, control and/or manage operation of robots $100_{1-N}$, to various degrees. An example of such a computing system is depicted schematically in FIG. 11. Data processing system 150 may be implemented, for example, as a cloud, distributed, server or other networked computing system accessible to robots $100_{1-N}$ from multiple users, or in some implementations may be a single user system, or even integrated into a single robot.

Various modules or engines may be implemented as part of data processing system 150 as software, hardware, or any combination of the two. For example, in FIG. 1, data processing system 150 includes a duration engine 152 for use in implementing at least a portion of the various techniques disclosed herein with respect to optimizing tasks based on historical task and location correlated duration data collected from one or more robots.

Duration engine 152 may include an extraction engine 154, an optimization engine 156, a scheduling engine 158 and a diagnostic engine 160, and may interface with one or more robots $100_{1-N}$, for example, via duration engine clients 162 implemented within each robot $100_{1-N}$.

Extraction engine 154 may be used to extract historical task and location correlated duration data from data collected by each robot $100_{1-N}$ and archive the data in mass storage, e.g., in a database 164. In some implementations, for example, extraction engine 154 may process activity logs generated by each robot $100_{1-N}$, although in other implementations, other types or formats of data capable of being generated by a robot may be processed. In some implementations, extraction and/or other processing may also be performed in a robot rather than in data processing system 150, and in some implementations, at least a portion of the data from which historical task and location correlated duration data is extracted may be collected externally from a robot, e.g., based on external monitoring of a robot in the environment.

The data extracted by extraction engine 154 may be used by a number of different components in duration engine 152 to generally optimize future robot performance. For example, optimization engine 156 may be used to utilize the historical task and location correlated duration data to optimize one or more future tasks performed by the same or different robots from which data has been collected. Scheduling engine 158 may be used to optimize scheduling of the same or different robots based upon the collected data. Diagnostic engine 160 may be used to diagnose performance and other issues from the collected data, e.g., for the purpose of notifying a service, user or manufacturer, or for autonomously addressing issues in some implementations. It will be appreciated that in other implementations, the functionality of some engines may be augmented, combined or split, while in other implementations, other combinations of these and other engines may be used in duration engine 152.

FIG. 1 also illustrates that data processing system 150 may also be in communication with one or more client devices 166, e.g., other computer systems, single user computers, handheld or wearable devices, mobile devices, etc., and through which user input may be received from, and output may be conveyed to, various types of users, e.g., homeowners and other end users, service providers, manufacturing representatives, developers, etc. In some implementations, data processing system 150 may also include a user interface for interfacing directly with some users.

In addition, while robots $100_{1-N}$, client devices 166 and data processing system 150 are depicted separately in FIG. 1, this is not meant to be limiting. In various implementations, one or more aspects (e.g., modules, engines, etc.) depicted in FIG. 1 as implemented on robots $100_{1-N}$ or robot management system 150 may be implemented on the other and/or in a client device 166, may be distributed across any or all, and/or may be distributed across any or all in combination with other components not depicted in FIG. 1. In addition, in implementations in which robots $100_{1-N}$, client devices 166 and data processing system 150 are separate, they may communicate over one or more wired or wireless networks (not depicted) or using other wireless technology, such as radio, Bluetooth, infrared, etc. Further, any data that is maintained in any of robots $100_{1-N}$, client devices 166 and/or data processing system 150 and used in connection with task optimization may be maintained in any or all of the aforementioned devices and systems.

In addition, in situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 2:
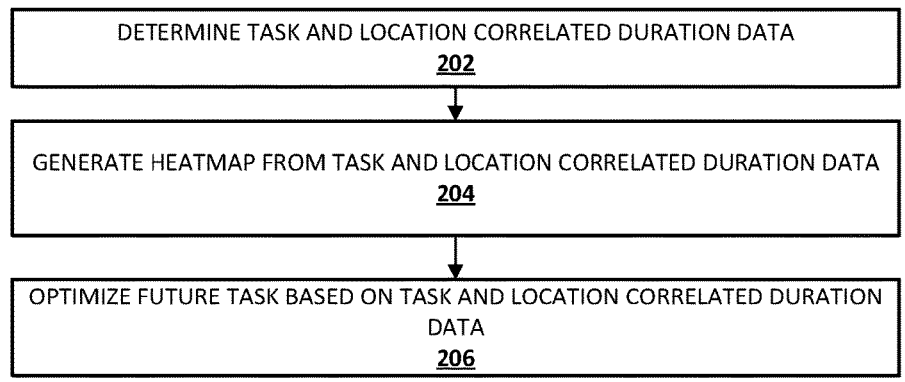
FIG. 2 depicts an example method for optimizing a future task based on historical task and location correlated duration data, in accordance with various implementations.

FIG. 2 depicts an example sequence of operations 200 for optimizing a task based on historical task and location correlated duration data, e.g., as may be implemented in data processing system 150, one or more client devices 166 and/or one or more robots $100_{1-N}$ of FIG. 1. In block 202, historical task and location correlated duration data may be determined for one or more tasks performed by one or more robots. The duration data may be determined for a plurality of locations of one or more spatial regions served by the one or more robots. As will become more apparent below, in some implementations, block 202 may determine duration data for multiple locations for one robot of one user in one spatial region (e.g., a dwelling), while in other implementations, block 202 may determine duration data for more than one robot and/or for more than one user and/or for more than one spatial region (e.g., multiple dwellings). Determining duration data, in this regard, may include, but is not limited to, collecting duration data, retrieving stored duration data, extracting duration data from other data, parsing duration data into task and/or location-specific categories, organizing duration data, and other operations generally associated with obtaining a set of duration data that is correlated with one or more different tasks and one or more different locations.

Figure 7:
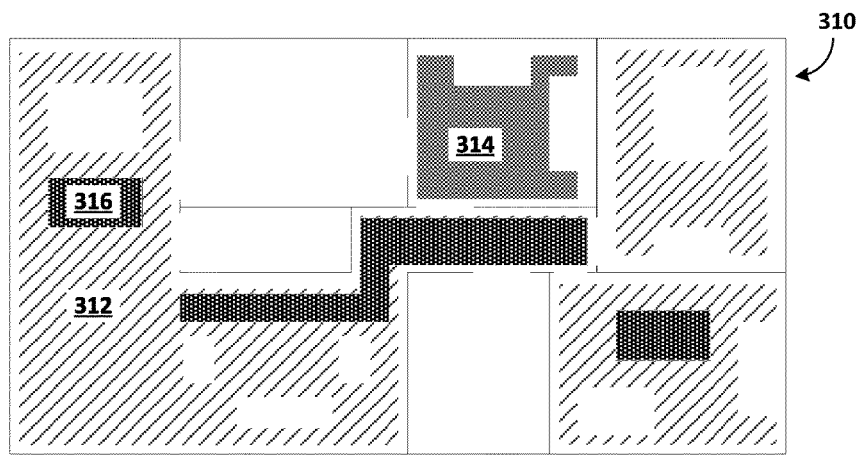
FIG. 7 depicts an example heatmap visualization generated

Next, in some implementations, block 204 may generate a heatmap from at least a portion of the task and location correlated duration data. A heatmap may be considered to be a data structure that spatially organizes the set of duration data into multiple locations, and in some instances, is additionally partitioned or organized by task. A heatmap in some implementations may be used to generate a heatmap visualization, i.e., a visual depiction of the duration data in the heatmap, while in other implementations, no visualizations may be generated. Even without a visualization, a heatmap generally provides a mechanism by which the relative amount of time that one or more robot spends performing certain tasks in different locations can be ascertained. One example visualization is illustrated in FIG. 7, discussed in greater detail below.

Next, block 206 may optimize a future task based on the task and location correlated duration data. The future task may be, for example, a task performed by the same robot(s) from which the duration data was determined and/or a task performed by other, different robots. As will become more apparent below, the optimization of a future task may incorporate optimizations such as reengineering tasks, scheduling recharges, identifying systemic issues and other diagnostic activities, prioritizing tasks, scheduling tasks, presenting visualizations, notifications and/or recommendations to users to encourage changes in habits or in an environment to improve future tasks, among others.

Figure 3:
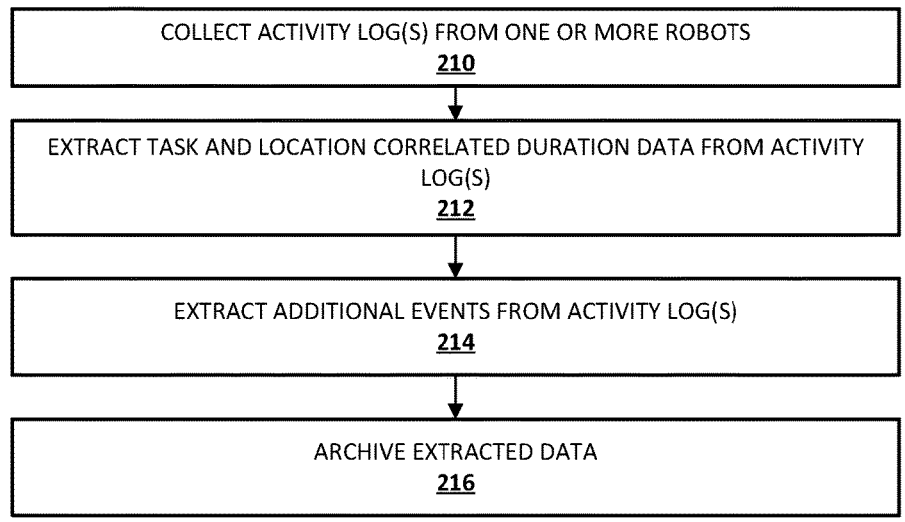
FIG. 3 depicts an example implementation of the determine task and location correlated duration data operation of FIG. 2.

FIG. 3 illustrates an example implementation of block 202 of FIG. 2 that determines duration data from activity logs produced by one or more robots. In this implementation, all operations may be performed in extraction engine 154, although in other implementations, at least a portion of these operations may be performed by one or more robots. Block 210, in particular, collects activity logs from one or more robots, and block 212 extracts task and location correlated duration data from the activity logs.

An activity log, in this regard, may be considered to include a log representing events generated by a robot during operation. During the normal operation of a robot, for example, positioning and other data may be generated internally by the robot in association with controlling its movement and other activities. In some implementations, therefore, this data may be stored as log data and used to generate historical task and location correlated duration data.

In some implementations, for example, the events in an activity log may relate to various operations such as starting and completing tasks, activities, operations, etc., and as such, in these implementations block 212 may extract historical task and location correlated duration data by analyzing the events to detect the times and locations associated with the beginning and ending of various tasks. Activity logs may also, in some implementations, include additional events, e.g., error or exception events representing issues encountered by a robot during operation, events triggered when tasks are not completed or terminated prematurely (e.g., if shut off by a user, or if not completed within a scheduled time, etc.), as well as events indicative of user instructions or other feedback. As such, in some implementations block 214 may extract additional events from the activity logs that may be relevant to task optimization, Block 216 may then archive the extracted data, e.g., in a database or other suitable mass storage. In some implementations, the archived extracted data may be limited to a single robot and/or a single user, while in other implementations, extracted data may be aggregated across multiple robots and/or multiple users to expand the knowledge based used when optimizing tasks.

As will become more apparent below, the historical task and location correlated duration data for multiple robots, users and/or environments may be considered to be aggregated historical task and location correlated duration data in some implementations, and that, in some instances, the aggregated historical task and location correlated duration data may be used collectively for task optimization, or may be compared against the historical task and location correlated duration data for a particular robot or user when optimizing a task. In still other implementations, the historical task and location correlated duration data used to optimize a task may be limited to only the duration data for a particular robot, user and/or environment.

To further illustrate the operations performed in FIG. 3, FIG. 4 illustrates a dwelling 300 serving as an example environment or spatial region within which a robot 302 may operate, while FIG. 4 illustrates at 304 a portion of an example activity log 304 for robot 302. Each row of the activity log 304 represents an event, and each column represents an item of data that is represented by the event. Thus, each event in activity log 304 includes a data and time of the event that represent a timestamp, along with a position of the robot represented by x and y coordinates on an area map maintained by the robot, an area, room or region corresponding to the position, and an action, it will be appreciated that other event formats may be used in other implementations, particularly given that some information, such as the area, can generally be derived from the coordinates of the position, and given that it may be desirable to include additional information in some implementations that further characterizes each action.

It may be seen from activity log 304 that robot 302, in sequence, begins washing dishes, and then, once complete, moves to the living room, vacuums the living room, moves to the dining room, and vacuums the dining room. Further, when vacuuming the dining room, the robot pauses to remove a blockage that occurs while vacuuming.

FIG. 5 also illustrates an example set of duration data 306 that may be generated from activity log 304 by block 212 (see FIG. 3). The duration data in this implementation includes a table of three task and location correlated duration values. The first, which is correlated with a task of "dishwashing" and a location of "kitchen" has a duration of about 4 minutes and 58 seconds. The second, which is correlated with a task of "vacuuming" and a location of "living room", has a duration of about 15 minutes and 32 seconds. The third, which is correlated with a task of "vacuuming" and a location of "dining room", has a duration of about 8 minutes and 3 seconds. In addition, in some implementations, in order to tie the duration data with a user and robot, additional columns may be provided to identify both a user identifier and a robot identifier for each duration value.

It will be appreciated than different and/or additional data may be incorporated into historical task and location correlated duration data, so the invention is not limited to the particular format illustrated in FIG. 5. Furthermore, it will be appreciated that duration data may be correlated to different types of locations in other implementations. For example, in other implementations duration data may be correlated to specific bounding boxes or other sizes or shapes of areas or volumes, or even to specific points in space. In some implementations, for example, it may be desirable to generate duration data for multiple areas within each room of environment 300 to assist in identifying particular areas within each room where durations are greater or lesser than other areas in the same or different rooms.

Figure 6:
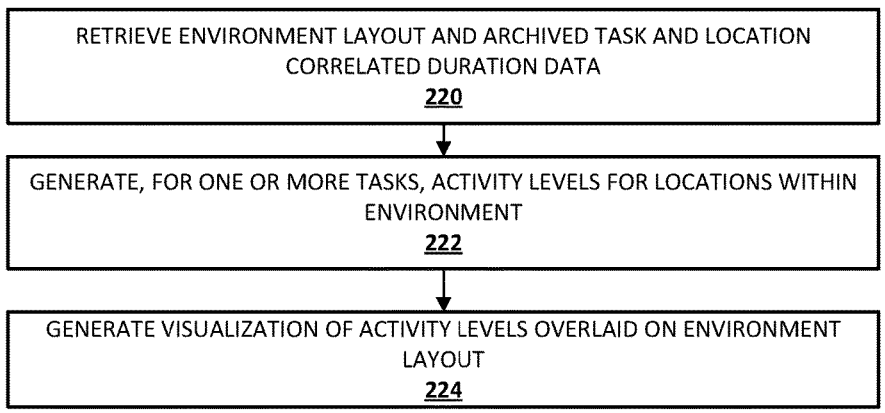
FIG. 6 depicts an example implementation of the generate heatmap from task and location correlated duration data operation of FIG. 2.

FIG. 6 next illustrates an example implementation of block 204 of FIG. 2 that generates a heatmap from the determined duration data, and in some implementations, may also generate a visualization of such a heatmap. Block 220, in particular, retrieves an environment layout (e.g., a floorplan) and archived historical task and location correlated duration data for a robot in the environment. Block 222 then generates, for one or more tasks, activity levels for multiple locations within the environment, and block 224 generates a visualization of the activity levels overlaid on a visualization of the environment layout, thus generating a visualization of the heatmap to illustrate location correlated activity levels throughout at least a portion of the environment. The activity levels may include, for example, absolute or relative values corresponding to the amount of time expended by a robot when performing a task in particular locations, and as such, a visualization may be implemented using different colors, shades, patterns, etc. to represent the different activity levels. FIG. 7, for example, illustrates an example visualization 310 of an environment layout corresponding to environment 300 of FIG. 4, with different patterns 312, 314, 316 used to visually distinguish different activity levels in different locations for a task (e.g., for vacuuming the dwelling). Hence, it may be determined from the visualization, for example, that certain areas of the dwelling take longer to vacuum than others, e.g., due to higher traffic or higher dirt levels, or potentially due to more complicated paths caused by the presence of furniture or other obstacles. Regardless of the cause, however, those areas of higher activity levels may present opportunities for optimizing a vacuuming task based upon the determined activity levels.

Figure 8:
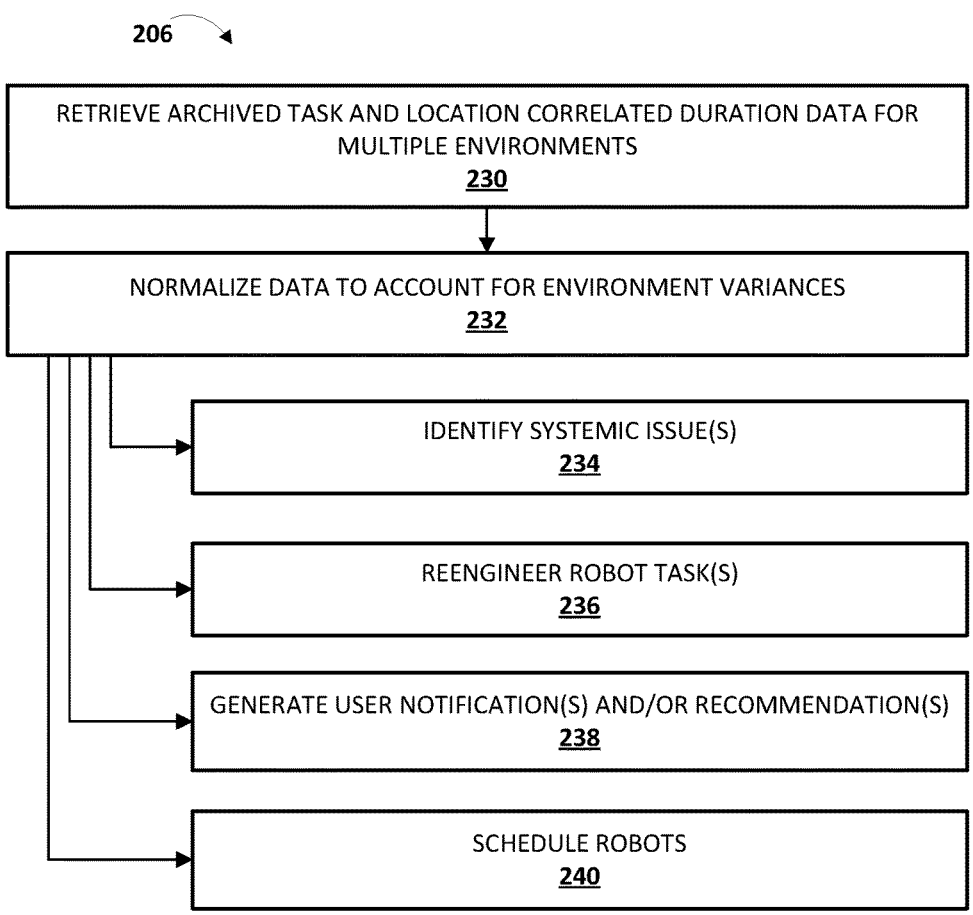
FIG. 8 depicts an example implementation of the optimize future task based on task and location correlated duration data operation of FIG. 2.
Figure 9:
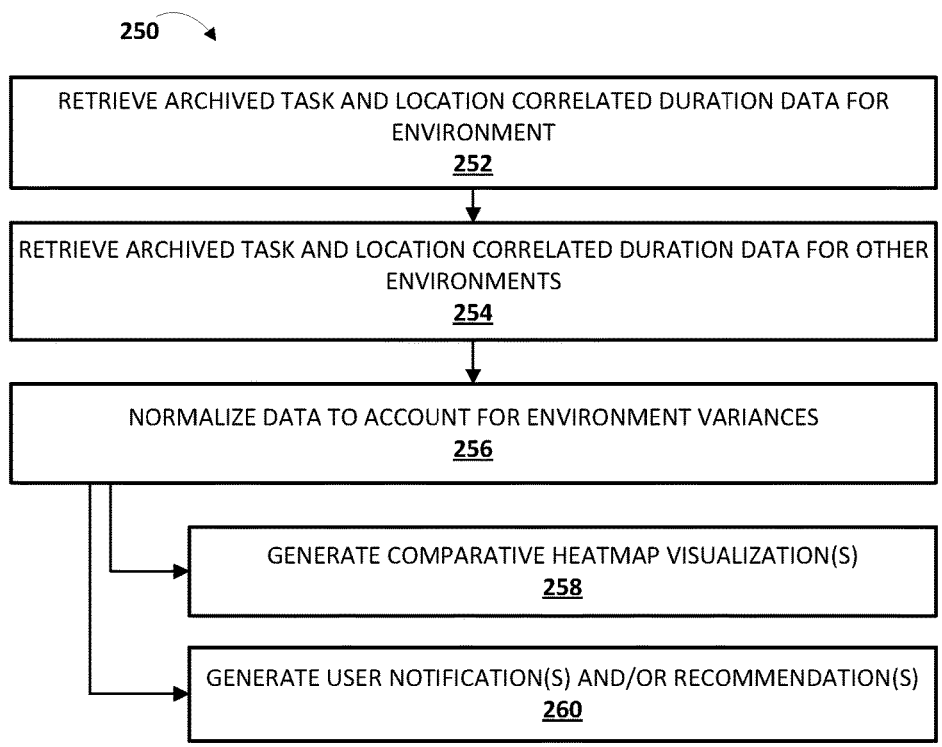
FIG. 9 depicts another example implementation of the optimize future task based on task and location correlated duration data operation to that of FIG. 8.
Figure 10:
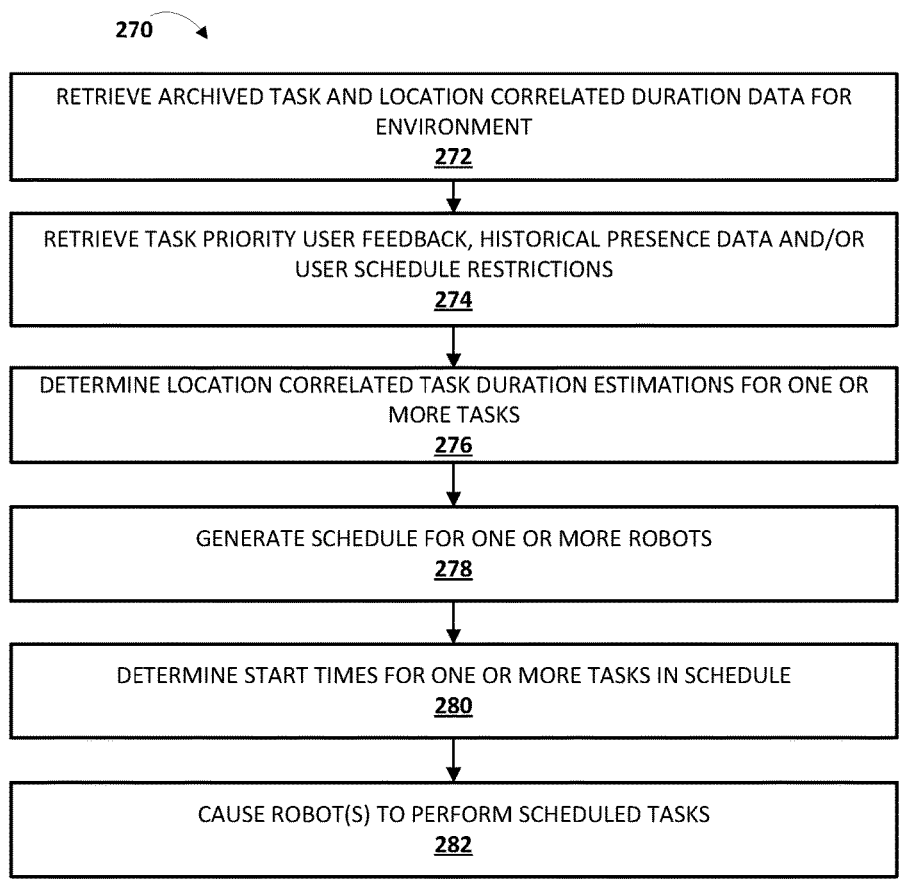
FIG. 10 depicts yet another example implementation of the optimize future task based on task and location correlated duration data operation to that of FIG. 8.

Now turning to FIGS. 8-10, each of these figures illustrates different example implementations for implementing block 206 of FIG. 2 to optimize a future task in response to historical task and location correlated duration data. FIG. 8, in particular, illustrates an implementation that optimizes tasks based upon aggregated data from multiple environments, e.g., environments associated with multiple users and/or robots. In block 230, for example, archived historical task and location correlated duration data for the multiple environments is retrieved, and then in block 232 the data is normalized to account for environment variances. While various normalizations may be performed, in some embodiments normalizations may be made to compensate for variances such as room/area size or square footage, number of rooms/areas, obstructions, number of occupants, or other application and/or environmental information that inhibits making an "apples to apples" comparison between duration data in different environments. Thus, in the example of vacuuming a living room, normalization may be used to account for room size variations to identify whether a vacuuming task in one environment is performed more efficiently than in another environment. The number of factors that may be accounted for in block 232 are innumerable given the wide variety of tasks, environments, and applications for which normalization may be used.

Blocks 234-240 next represent various optimizations that may be performed based upon the normalized duration data. Block 234, for example, illustrates an identification of a systemic issue for a particular task or robot. Block 234 may in some implementations identify when an inefficiency detected in a particular task occurs across multiple environments, rather than being specific to a particular environment or user, indicating a potential need to address the systemic issue, e.g., via updates or refinements to a robot's operational code.

Block 236 illustrates a reengineering of a robot task, e.g., to update or refine the robot's operational code to perform a task more efficiently, at least for certain environment characteristics. For example, characteristics of a particular user's environment that result in suboptimal task performance may trigger reengineering of a robot task to accommodate those particular characteristics.

Block 238 may generate user notifications and/or recommendations. For example, analysis of duration data may indicate that a particular user's dwelling and/or habits could be modified to improve task performance. Such notifications may also trigger user feedback in some implementations to assist in reengineering tasks to accommodate a user's particular feedback or circumstances. For example, in some implementations a user could be notified that vacuuming is taking longer than expected in certain rooms because of too many obstructions, so decluttering and picking up items on the floor before vacuuming may be helpful. One example notification would be a notification the morning of a scheduled cleaning requesting that the user remove certain items from a room so that vacuuming by a robot later in the day can be completed more efficiently.

Block 240 may generate a schedule for one or more robots based upon the duration data. For example, in an implementation where robots are owned by a service provider and are transported to different customer dwellings on a daily basis to clean different dwelling, the duration data may be used to schedule the robots to maximize usage of the robots for a customer base.

FIG. 9 illustrates a sequence of operations 250 representative of another implementation of block 206 for use in performing optimizations for a particular robot, user or environment based upon a comparison with other environments. Block 252 in this implementation retrieves archived historical task and location correlated duration data for a specific environment, and block 254 then retrieves archived historical task and location correlated duration data for other environments, e.g., other environments that are comparable to the environment being analyzed in some fashion, e.g., based upon type of dwelling, neighborhood, geographical region, etc.

Block 256 next normalizes the data, e.g., in a similar manner to block 232 of FIG. 8, to account for environmental variances.

Block 258 next illustrates one potential optimization, that of generating a comparative heatmap visualization for the user. A comparative heatmap visualization may be similar to heatmap visualization 310 of FIG. 7 in some implementations, but rather than representing activity levels for a single environment, the comparative heatmap visualization may present variations for a particular environment relative to other environments (e.g., to illustrate that the amount of time to vacuum a living room exceeds that of most other environments).

Block 260 illustrates another potential optimization, the generation of user notifications and/or recommendations similar to block 238 of FIG. 8. Notifications and/or recommendations may be made based upon any detected variances between a user's environment and other comparable environments.

FIG. 10 illustrates another sequence of operations 270 for implementing block 206 for use in scheduling a robot based upon archived duration data. Block 272, for example, may retrieve archived historical task and location correlated duration data for a given environment, and block 274 may retrieve various additional data that may be useful in constructing a schedule for a robot. For example, block 274 may retrieve user schedule restrictions, e.g., requests to complete a task or series of tasks within a particular time window (e.g., between 8:00 am and 5:00 pm, before 6:00 pm, while the user is at work, etc.), or prior to some event (e.g., before guests arrive for dinner).

Block 274 may also retrieve historical presence data that may impact scheduling, e.g., expected times when a user or a user's pet is in certain rooms, is outside or is otherwise away from a dwelling. As but one example, if it is known that the user's dog sleeps in the kitchen between 2:00-3:00 pm every day, that knowledge may be used to schedule a robot to work in other rooms during that time period. In addition, historical presence data may also be combined with explicit or inferred user preference data, e.g., when a particular task is noisy and the user has indicated a preference to not be around when the task is being performed.

Block 274 may also retrieve task priority user feedback that indicates a user's preferences for the order or importance of certain tasks. The feedback may be explicit (e.g., vacuum before doing the dishes), or may be non-explicit, and implied from certain user input (e.g., "please make sure you get the dishes done today," "I'm so glad you did the laundry today!", "why didn't you clean the bathrooms today?", etc.)

Next, block 276 may determine location correlated task duration estimations for one or more tasks, e.g., based on the archived historical task and location correlated duration data. Block 278 then generates a schedule for one or more robots based upon the above information. For example, in one implementation, a cleaning robot may have a list of tasks to do that is always longer than the robot has time to do each day during the time allotted. Based on task priorities and estimated durations, as well as potential restrictions due to historical presence data or other restrictions, block 278 may therefore attempt to pack in as many tasks as possible into the allotted time frame, and ensure that the tasks most needing completion (e.g., due to user feedback and/or time since they were last performed) will be completed during that time frame.

Block 280 may then determine start times for the various tasks in the schedule, and block 282 may cause one or more robots to perform the scheduled tasks. For example, blocks 280 and 282 may download a set of tasks and start times therefor to one or more robots in some implementations such that the robots implement the schedule.

It will be appreciated that the herein-described data may be used in other implementations to perform task optimizations other than those explicitly mentioned herein.

Figure 11:
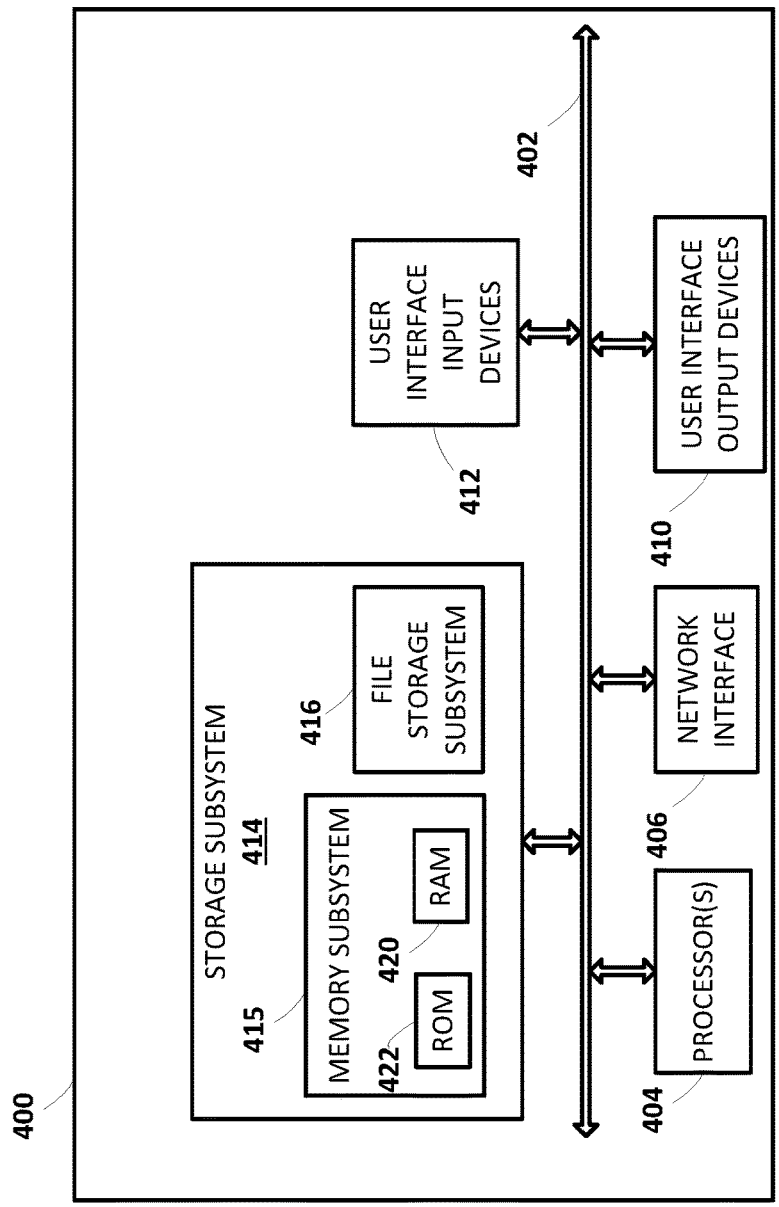
FIG. 11 schematically depicts an example architecture of a computer system.

FIG. 11 is a block diagram of an example computer system 400. Computer system 400 typically includes at least one processor 404 which communicates with a number of peripheral devices via bus subsystem 402. These peripheral devices may include a storage subsystem 414, including, for example, a memory subsystem 415 and a file storage subsystem 416, user interface output devices 410, user interface input devices 412, and a network interface subsystem 406. The input and output devices allow user interaction with computer system 400. Network interface 406 provides an interface to outside networks and is coupled to corresponding interface devices in other computer systems.

User interface input devices 412 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 400 or onto a communication network.

User interface output devices 410 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 400 to the user or to another machine or computer system.

Storage subsystem 414 stores programming and data constructs that provide the functionality of some or all of the modules described herein. For example, the storage subsystem 414 may include the logic to perform selected aspects of method 200, and/or to implement one or more aspects of robots $100_{1-N}$, client devices 166 and/or data processing system 150. Memory 415 used in the storage subsystem 414 can include a number of memories including a main random access memory (RAM) 420 for storage of instructions and data during program execution and a read only memory (ROM) 422 in which fixed instructions are stored. A file storage subsystem 416 can provide persistent storage for program and data files, and may include a hard disk drive, a CD-ROM drive, an optical drive, or removable media cartridges. Modules implementing the functionality of certain implementations may be stored by file storage subsystem 416 in the storage subsystem 414, or in other machines accessible by the processor(s) 404.

Bus subsystem 402 provides a mechanism for letting the various components and subsystems of computer system 400 communicate with each other as intended. Although bus subsystem 402 is shown schematically as a single bus, alternative implementations of the bus subsystem may use multiple busses.

Computer system 400 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 400 depicted in FIG. 11 is intended only as a specific example for purposes of illustrating some implementations. Many other configurations of computer system 400 are possible having more or fewer components than the computer system depicted in FIG. 11.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method performed by one or more processors, the method comprising:

determining historical task and location correlated duration data for one or more tasks performed by a first robot in a plurality of locations of a spatial region served by the first robot, the historical task and location correlated duration data including a first duration of a first task performed by the first robot in a first location of the spatial region served by the first robot;

generating a heatmap for at least a portion of the spatial region served by the first robot based upon the historical task and location correlated duration data; and optimizing performance of a second task by the first robot or by a second robot based upon the first duration of the first task.

2. The method of claim 1, further comprising aggregating historical task and location correlated duration data for multiple tasks performed by multiple robots in multiple spatial regions served by the multiple robots.

3. The method of claim 2, wherein optimizing performance of the second task includes detecting a systemic issue based upon the aggregated historical task and location correlated duration data and/or the historical task and location correlated duration data for the first robot.

4. The method of claim 2, wherein optimizing performance of the second task includes reengineering the second task based upon the aggregated historical task and location correlated duration data and/or the historical task and location correlated duration data for the first robot.

5. The method of claim 2, wherein optimizing performance of the second task includes generating a user notification or recommendation based upon the aggregated historical task and location correlated duration data and/or the historical task and location correlated duration data for the first robot.

6. The method of claim 2, further comprising normalizing the historical task and location correlated duration data for the first robot to account for environmental variances relative to the aggregated historical task and location correlated duration data.

7. The method of claim 1, wherein optimizing performance of the second task includes generating a schedule for the first robot.

8. The method of claim 7, wherein generating the schedule for the first robot includes generating the schedule to accommodate a user schedule restriction, historical presence data and/or task priority user feedback.

9. The method of claim 8, wherein the task priority user feedback is non-explicit user feedback.

10. The method of claim 1, further comprising generating a visualization of the heatmap to illustrate location correlated activity levels throughout the portion of the spatial region.

11. The method of claim 1, wherein the heatmap is a comparative heatmap comparing activity levels in the portion of the spatial region against activity levels associated with aggregated historical task and location correlated duration data associated with other spatial regions.

12. The method of claim 1, wherein determining the historical task and location correlated duration data includes retrieving archived historical task and location correlated duration data.

13. The method of claim 1, wherein determining the historical task and location correlated duration data includes extracting task and location correlated duration data from an activity log of the first robot.

14. The method of claim 13, wherein determining the historical task and location correlated duration data further includes extracting one or more events from the activity log.

15. The method of claim 1, wherein the first robot is a multipurpose residential cleaning robot, and the spatial region comprises a dwelling.

16. An apparatus including memory and one or more processors operable to execute instructions stored in the memory, comprising instructions to:

determine historical task and location correlated duration data for one or more tasks performed by a first robot in a plurality of locations of a spatial region served by the first robot, the historical task and location correlated duration data including a first duration of a first task performed by the first robot in a first location of the spatial region served by the first robot;

generate a heatmap for at least a portion of the spatial region served by the first robot based upon the historical task and location correlated duration data; and optimize performance of a second task by the first robot or by a second robot based upon the first duration of the first task.

17. The apparatus of claim 16, wherein the memory and one or more processors are resident in a data processing system interfaced with the first and second robots.

18. The apparatus of claim 16, wherein the memory and the one or more processors are resident in the first robot.

19. A non-transitory computer readable storage medium storing computer instructions executable by one or more processors to perform a method comprising:

determining historical task and location correlated duration data for one or more tasks performed by a first robot in a plurality of locations of a spatial region served by the first robot, the historical task and location correlated duration data including a first duration of a first task performed by the first robot in a first location of the spatial region served by the first robot;

generating a heatmap for at least a portion of the spatial region served by the first robot based upon the historical task and location correlated duration data; and optimizing performance of a second task by the first robot or by a second robot based upon the first duration of the first task.

20. The apparatus of claim 16, wherein the instructions further comprise instructions to aggregate historical task and location correlated duration data for multiple tasks performed by multiple robots in multiple spatial regions served by the multiple robots.

* * * * *